March 30, 1954     K. P. SCHOEPPNER     2,673,767
SLEEVE BEARING
Filed Aug. 16, 1950
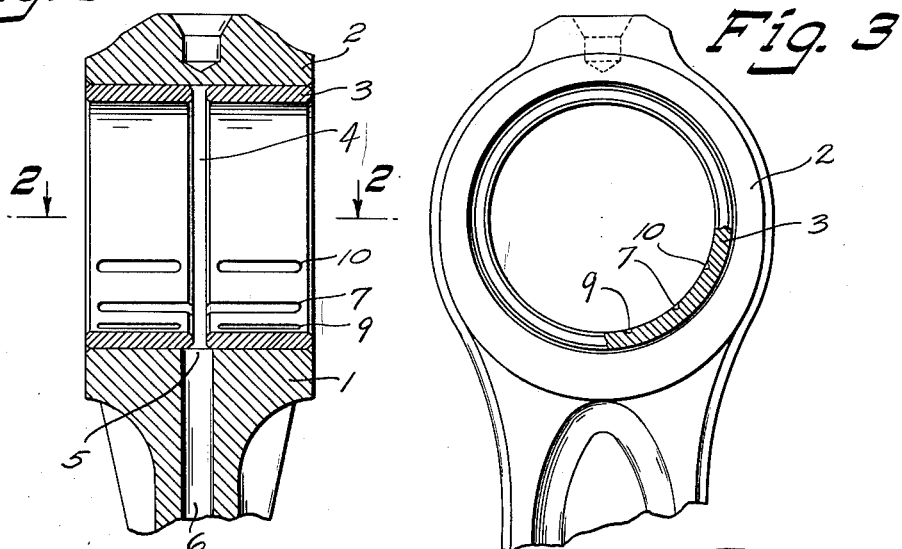
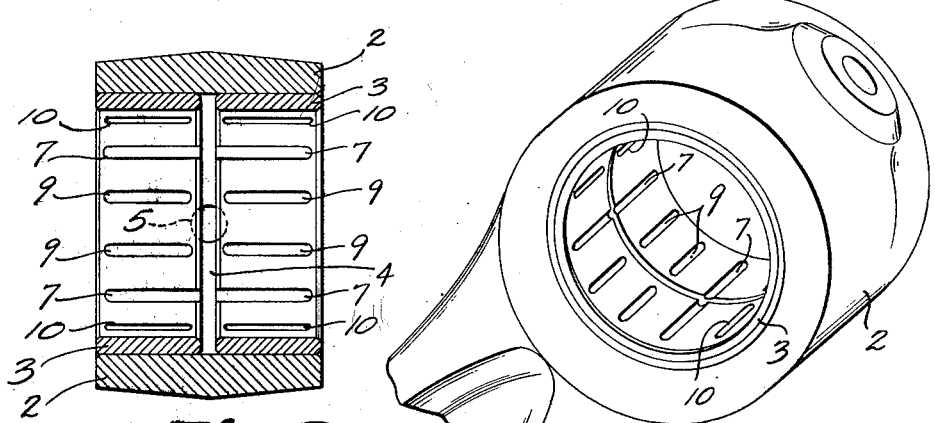
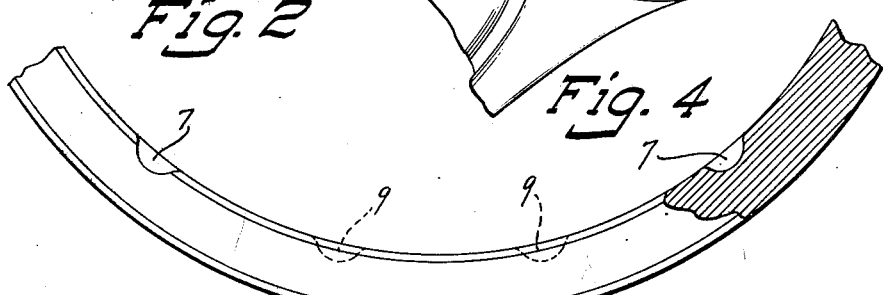
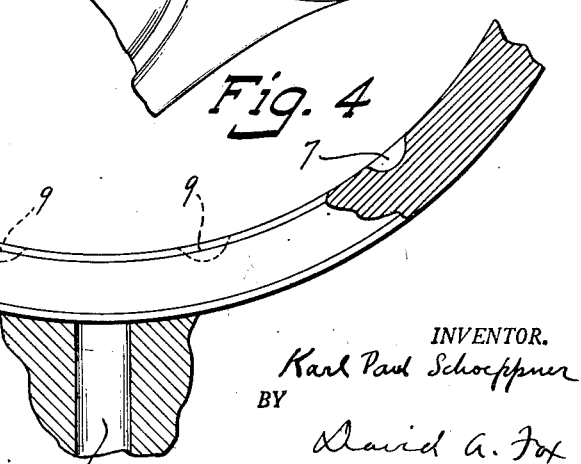
INVENTOR.
Karl Paul Schoeppner
BY
David A. Fox
Attorney Patented Mar. 30, 1954

2,673,767

UNITED STATES PATENT OFFICE 2,673,767

SLEEVE BEARING

Karl Paul Schoeppner, Port Washington, Wis., assignor to Harnischfeger Corporation, Milwaukee, Wis., a corporation of Wisconsin Application August 16, 1950, Serial No. 179,850

2 Claims. (Cl. 308—122)

This invention relates to improvements in bearings and it resides more particularly in improved means for lubricant distribution in cylindrical journal bearings of the so-called sleeve type comprising blind lubricant pockets alternating with lubricant supply indentations.

An object of this invention is to provide a sleeve bearing which will better withstand periodic radial load applied through a journal executing oscillating rotation as for example in the bushing customarily used for the bearing surface for a wrist pin in a connecting rod in an internal combustion engine.

A further object of the invention is to provide a system of grooves and pockets in that part of a bearing surface which bears the maximum load, said system of grooves and pockets being adapted to distribute and more positively maintain a film of lubricant uniformly over said surface.

Other objects and advantages will appear from the following description of the invention.

In the description reference is made to the accompanying drawings which form a part hereof and in which there is shown by way of illustration and not of limitation one form of apparatus in which this invention may be embodied.

In the drawings:

Fig. 1 is a broken away view in cross sectional side elevation of the wrist pin end of a connecting rod in which is mounted bushings constructed in accordance with this invention, Fig. 2 is a plan view in the plane indicated at 2—2 in Fig. 1, Fig. 3 is a view in front elevation with parts broken away of the apparatus shown in Fig. 1, Fig. 4 is a perspective broken away view of the apparatus shown in Fig. 1, Fig. 5 is a fragmentary view in end elevation of a bushing with details of the grooves as employed in the apparatus shown in Fig. 1.

Like parts are identified by the same reference numerals throughout the several views.

As appears in the drawings, one form of a bushing 3, constructed in accordance with this invention and having a cylindrical journal surface is shown mounted in each half of the end 2 of a connecting rod 1 to act as a bearing for a wrist pin for said connecting rod. Circumferentially disposed space 4 between said bushings is adapted to provide a supply passage for a lubricant under pressure, said passage being in communication with an inlet port 5, said port coinciding with the outlet end of a lubricant supply conduit 6 disposed within connecting rod 1 and extending between the wrist pin and the crank shaft.

As shown more specifically in Fig. 2, the lower half of the journal surface of each bushing 3 intended to contact the wrist pin is provided with two transverse indentations or grooves 7 adapted to supply lubricant to the journal surface, each of said grooves communicating with circumferential passage 4, two of said transverse grooves being disposed on each side of said circumferential passage 4 equidistant from inlet port 5. Each bushing 3 is also provided with intermediate transverse indentations or blind pockets 9. In a similar manner each bushing 3 is provided with a pair of blind pockets 10, each of a length equal to pockets 9 disposed beyond the grooves 7. In each of the bushings 3 there are thus provided six channels serving either as feeder grooves or blind pockets spaced approximately 26 degrees apart extending at right angles to the circumferential run of the main distribution passage 4.

The successful operation of cylindrical journal bearings is dependent upon distribution and maintenance of a film of lubricant between the journal and the bearing surface. Although the clearance between the journal and the bearing, the characteristics of the lubricant, and the intensity of the pressure exerted on the lubricant film are important factors in bearing operation, the manner in which the lubricant is distributed is the principal factor contributing to either long life or failure of such bearing.

In the operation of bearings constructed in accordance with the present invention failures have been eliminated in services where bushings as heretofore constructed have failed, notwithstanding that the bearing surface is materially reduced by the novel arrangement of the grooves herein described. A lubricant forced from conduit 6 in connecting rod 1 into port 5 is caused to extend around circumferential passage 4 and is distributed transversely along grooves 7. Periodic loading of the bearing surface in which said grooves are cut and the oscillating rotation of the bearing on the wrist pin facilitates a flow of the lubricant from transverse feeder grooves 7 in circumferential directions into blind pockets 9 and 10 which are not in direct communication with the source of lubricant supply. Such pockets thus act as reservoirs for the lubricant so that all parts of the bearing surface on which the maximum pressure is exerted, continue to receive the amount of lubricant necessary to maintain a uniform film between the journal and the bearing surface. Such reservoirs for lubricant have been found particularly advantageous for the wrist pin bushings of two cycle engines in which the loading of the wrist pins although periodic is unidirectional in contrast with the reversal of loading which may occur in four cycle engines.

The novel provision of blind pockets in accordance with this invention in conjunction with the transverse distributing grooves appear to facilitate prompt circumferential distribution of the lubricant film under periodic loading and oscillating rotation when starting up an engine after lubricant has had a chance to drain from the wrist pin journals. This is believed to be due to the fact that the blind pockets serve to render a freer path to circumferential travel of lubricant which might otherwise travel across the grooves 7 and thence escape from the ends of the same through the shortest path available without traveling circumferentially to the areas requiring lubrication. After the blind pockets become filled they then serve as reservoirs from which lubricant is wiped into the areas needed by the oscillating rotation. These actions seem to become accentuated as wear increases clearances.

I claim:

1. In a sleeve bearing a pair of spaced bushings having cylindrical journal surfaces, a mounting therefor maintaining the same in spaced relation, lubricant supply grooves formed by transverse indentations in the cylindrical surfaces of said bushings, said mounting and the spacing of said bushings forming a circumferentially disposed lubricant supply passage between said bushings communicating with said lubricant supply grooves adapted to supply lubricant thereto under pressure, blind pocket reservoirs formed by transverse indentations in said cylindrical surfaces spaced equidistant right and left from said transverse supply grooves in planes parallel with said supply grooves, said reservoirs being adapted to receive lubricant overflow from said transverse supply grooves.

2. In a plain bearing a member having a cylindrical internal journal surface, a lubricant entrance opening extending radially inwardly through said member, a circumferential lubricant channel in said journal surface intercepting and communicating with said radial entrance opening, a set of circumferentially spaced branching lateral lubricant supply grooves in said journal surface extending from said circumferential channel laterally in an axial direction terminating short of the side margins of said journal surface to deter escape of lubricant supplied thereto under pressure through said entrance opening and said circumferential channel, and film maintaining and distributing means comprising pairs of spaced axially extending indentations in said journal surface terminating short of said circumferential channel on the one hand and the side margins of said journal surface on the other hand so as to render said indentations closed on all sides except the side facing the surface of a journal intended to occupy said bearing, a single pair of said indentations being interposed between each adjacent pair of lubricant supply grooves.

KARL PAUL SCHOEPPNER.

References Cited in the file of this patent

FOREIGN PATENTS

| Number | Country | Date |
|---|---|---|
| 149,169 | Switzerland | Dec. 1, 1931 |
| 242,769 | Great Britain | Nov. 19, 1925 |
| 770,919 | France | Sept. 24, 1934 |